Dec. 5, 1967
F. M. WOOD
3,356,938
APPARATUS AND METHOD FOR MAGNETICALLY DETECTING
DEFECTS IN FERROMAGNETIC MEMBERS BY MEASURING
CHANGES IN RELUCTANCE PATHS
CAUSED THEREBY
Filed Aug. 29, 1963
2 Sheets-Sheet 1
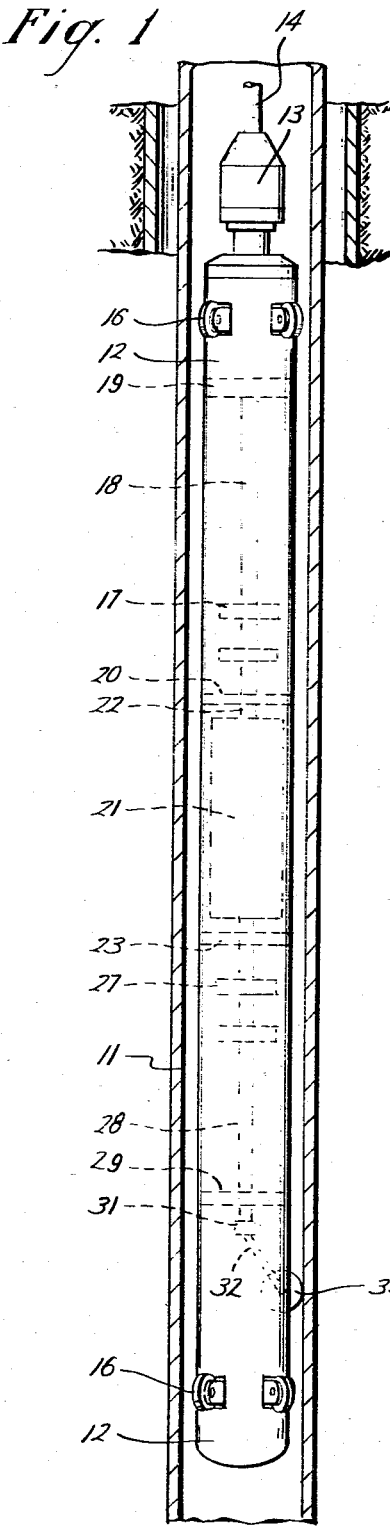
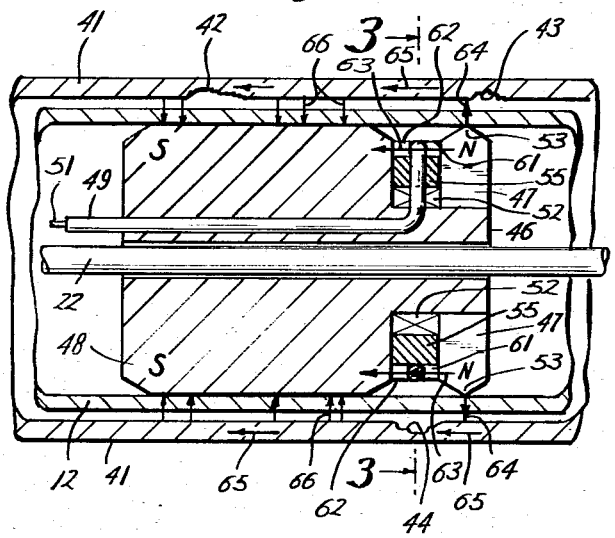
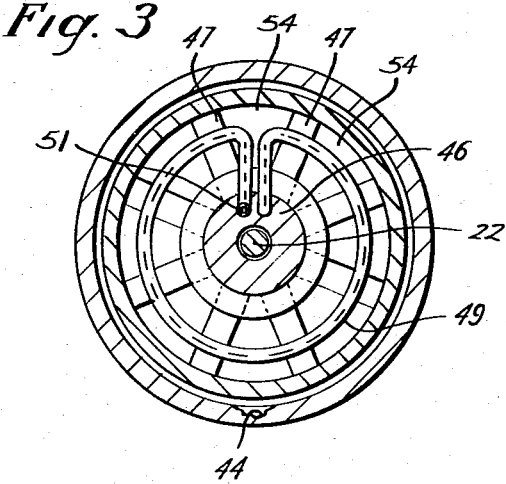
Fenton M. Wood
INVENTOR.
BY Arnold, Roylance & Harris
ATTORNEYS

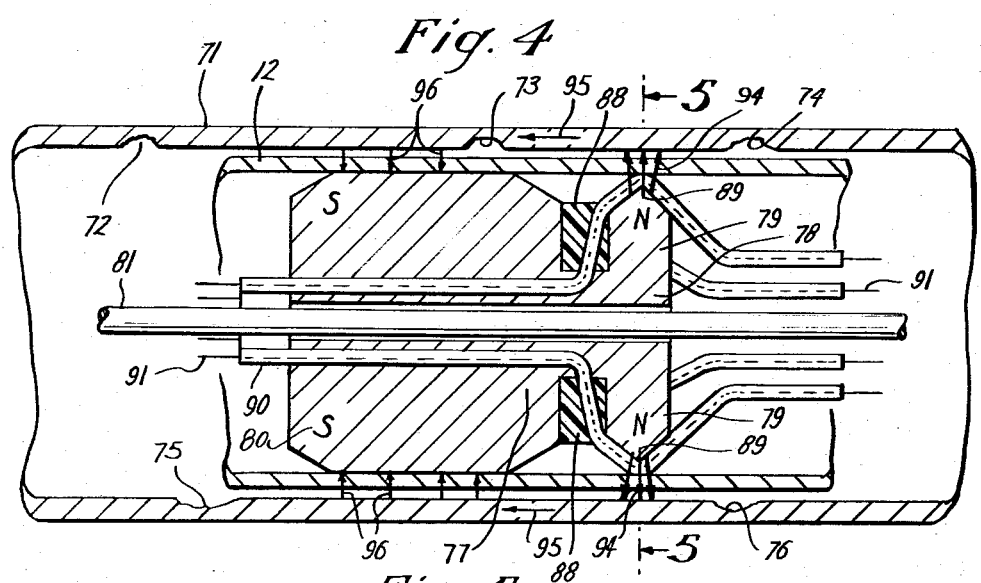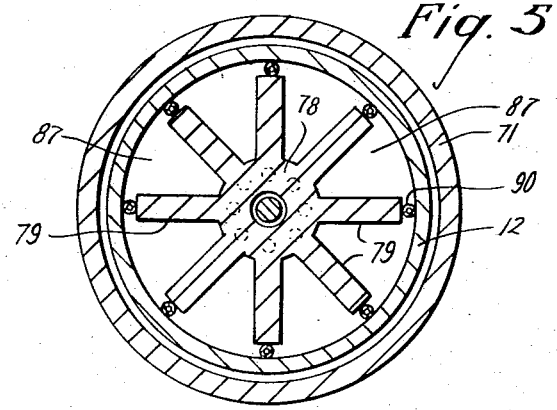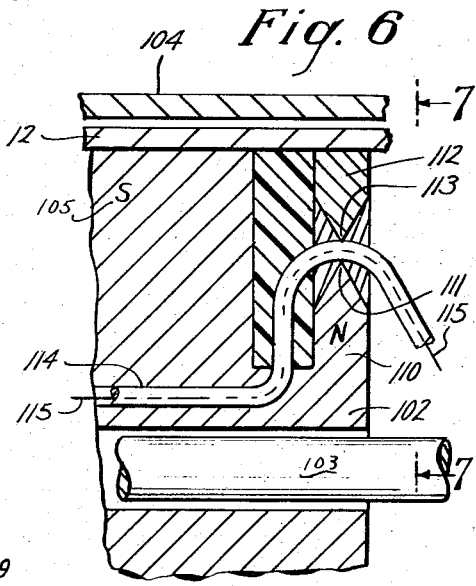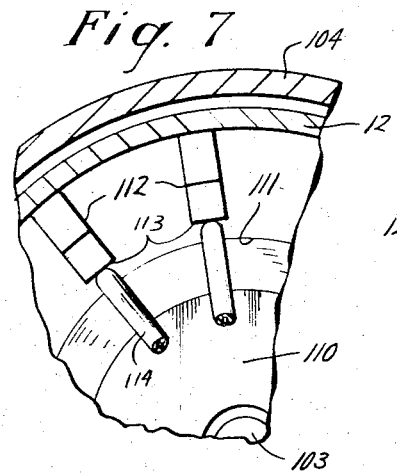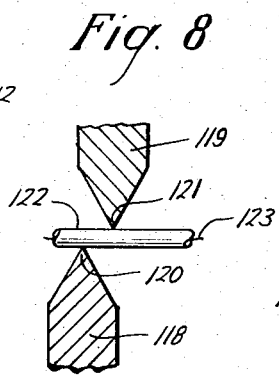

United States Patent Office 3,356,938
Patented Dec. 5, 1967

3,356,938
APPARATUS AND METHOD FOR MAGNETICALLY DETECTING DEFECTS IN FERROMAGNETIC MEMBERS BY MEASURING CHANGES IN RELUCTANCE PATHS CAUSED THEREBY
Fenton M. Wood, Sugarland, Tex., assignor, by mesne assignments, to American Machine & Foundry Company, New York, N.Y., a corporation of New Jersey
Filed Aug. 29, 1963, Ser. No. 305,496
21 Claims. (Cl. 324—37)

This invention relates to an apparatus and method for magnetically testing ferromagnetic tubular members. More particularly, this invention relates to apparatus and method for testing such tubular members from the inside by the use of a magnetic field the variations of which are recorded on a magnetic medium as indications of defects or discontinuities in such members.

In the art of calipering or testing ferromagnetic members for defects, there has long been a need for a self-contained device which could inspect the member from the inside without becoming fouled by dirt, debris, paraffin and the like and which could provide a permanent record or log of any defects or discontinuities detected.

There have been many prior art apparatuses developed which have attempted to perform this type of testing, but none have been fully satisfactory because they utilized moving parts which could easily be rendered inoperative by paraffin, sand, scale and the like or were not completely satisfactory for other reasons.

There has also been a need for an inspection unit which was non-contacting and hence would not scratch the internal pipe coating and would not be adversely effected by scale in the pipe, but rather would provide accurate measurements in spite of pipe scale.

Many prior art devices utilize an outside power source which require a cable conductor connection to the ground surface, thus requiring many thousands of feet of expensive conductor cable and equipment for handling it, stuffing it into the well tubing, and transporting it.

It is therefore an object of this invention to provide an improved method and apparatus for testing tubular members, which method and apparatus is characterized by a simplicity of steps and parts.

It is another object of this invention to provide an improved method and apparatus for recording on an elongate record medium the occurrence of defects detected in a tubular member by passing said apparatus through said member, which apparatus and method overcome the aforesaid short-comings of the prior art.

These and other objectives of this invention will be obvious by reference to the description herein.

Briefly stated, the apparatus of this invention is adapted for detecting defects in a tubular ferromagnetic member, such as well tubing, and accordingly has a housing containing various components and is shaped to pass longitudinally through the tubular member. Inside the housing, there is a recording means which generally is comprised of a fixed or non-rotatable magnet shaped for disposition adjacent to the internal surface of the tubular member. The magnet is shaped to have one magnetic pole with a small area adjacent to the pipe surface and the other pole with a large surface area adjacent to the pipe surface so that flux may pass between the pole with the small surface area and the pipe through a narrow or concentrated radial flux path and between the pole with the larger surface area and the pipe through a broad or dispersed radial flux path.

There is also provided one or more slideways through the housing for slidably receiving an elongate magnetic medium, such as a recording wire, and on which variations in reluctance in the narrow flux path are recorded as indications of defects in the pipe. Hence, the particular arrangement of the slideway in relation to the magnet provides the means for applying the variations in reluctance to the magnetic medium.

Means are also provided for passing the recording medium or recording wire through the slideway while the housing is being moved relative to the pipe, whereby the variations in flux in the concentrated radial flux path are recorded on the recording wire as indications of defects in the pipe.

The invention may also be understood by reference to the drawings wherein the same numerals refer to like parts and in which:

FIG. 1 is a central vertical sectional view of a well tubing showing the positioning of the housing of the apparatus of this invention therein, with certain of the internal parts of the apparatus shown in outline form;

FIG. 2 is a central longitudinal sectional view of one form of the detecting or recording means of this invention as it might appear while being passed through a length of pipe placed in a horizontal position;

FIG. 3 is a cross-sectional view taken at line 3—3 of FIG. 2;

FIG. 4 is a central longitudinal sectional view of another form of the detecting or recording means of this invention as it appears being passed through a length of pipe;

FIG. 5 is a cross-sectional view taken at line 5—5 of FIG. 4;

FIG. 6 is a fragmentary longitudinal sectional view similar to the view of FIG. 4 but showing another embodiment of this invention;

FIG. 7 is a fragmentary cross-sectional view taken at line 7—7 of FIG. 6; and

FIG. 8 is a fragmentary longitudinal view similar to FIG. 6 but showing still another embodiment of this invention.

Referring to FIG. 1, there is generally shown well tubing 11 with search unit housing 12 suspended therein by connector 13 secured to steel wire line 14 for raising and lowering in tubing 11. Housing 12 is maintained in a central position in tubing 11 by spring loaded nylon rollers 16 positioned near the top and bottom of housing 12.

In the upper portion of housing 12, there is shown in outline form a playout reel 17 on which recording wire will normally be wound starting with the initial operation of the tool. Reel 17 is mounted for rotation on playout shaft 18 journaled for rotation in annular supports 19 and 20 secured to housing 12.

The detecting or recording means of this invention which constitutes the novel portion thereof is generally shown as inspection unit 21 and will be explained in detail hereinafter. Inspection unit 21 is conveniently shown mounted on fixed support shaft 22, which is secured at its ends to annular support 20 and lower annular support 23. However, inspection unit 21 need not be mounted on a shaft since it is *not* anticipated that is to be rotated.

Below inspection unit 21, take-up reel 27 is mounted for rotation on take-up shaft 28 journaled for rotation in support 23 and in lower annular support 29, both of which are secured to housing 12.

The lower portion of take-up shaft 28 is provided with a universal joint 31 connected to drive shaft 32 connected to ratchet wheel 33. Drive shaft 32 is adapted to be rotated as an incident of the rotation of ratchet wheel 33, which in turn is resiliently pressed against the internal surface of tubing 11 and thereby caused to rotate when housing 12 is raised upwardly.

It is to be understood that lower annular support 29 is so constructed to provide a seal between that portion of the tool therebelow and the balance of the tool there-above. Hence, no portion of the inspection unit is subjected to exposure to dirt, debris, drilling fluids and the like to which the outside of the tool might be exposed.

Alternatively, a clock mechanism could be substituted for ratchet wheel 33, which clock would provide rotation to shaft 28 upon being actuated at a predetermined time as upon upward movement of housing 12 in tubing 11. In that case, no metal parts at all will contact and possibly damage the internal coating of tubing 11.

In operation, an elongate magnetic medium such as recording wire will be initially wound onto playout reel 17. The recording wire would be passed through an aperture (not shown) in annular support 20, through inspection unit 21, through another aperture (not shown) in lower annular support 23 and onto take-up reel 27. It is to be understood that there could of course be a plurality of playout reels and a plurality of take-up reels such that a plurality of recording wires could be passed through inspection unit 21 simultaneously.

Housing 12 is lowered in well tubing 11 to the desired depth. Then, by raising upward on wire line 14, ratchet wheel 33 will be rotated thereby, causing drive shaft 32 to rotate, thereby rotating take-up shaft 28, causing the recording wire (not shown) to be wound onto take-up reel 27 and off of playout reel 17 and thus passing through insepction unit 21.

Independent means may also be provided for taking the recording wire from take-up reel 27, or taking the signals therefrom and re-winding back on playout reel 17 after operation of the tool.

The foregoing portion of the tool of this invention is generally old in the art and is similar to portions of the tool taught and claimed in U.S. Patent No. 2,907,111 issued to Calkins on Oct. 6, 1959 and assigned to the same assignee as the present invention. Thus, the present invention might be considered an improvement on the Calkins invention, with the novelty residing in the apparatus and method of inspecting, which will now be described in detail and portions of which may from time to time be referred to as the recording means.

One form of the inspection unit of this invention is shown in FIG. 2. There a section of ferromagnetic pipe 41 is shown with internal pits 42, 43 and 44. Positioned inside housing 12 and mounted on support shaft 22 is a fixed or non-rotating annular magnet having a magnetic core 46. The magnet is formed with a plurality of north poles 47 circumferentially spaced around and extending radially therefrom and an annular south pole 48 surrounding core 46 and having its outside surface forming a cylinder. Thus, it may be stated that south pole 48 has a substantially larger surface area for transmitting magnetic flux than does any one of the north poles and preferably all the north poles collectively. It is to be understood that core 46, north poles 47, and south pole 48 are one unit, but may be referred to as separate parts or as being attached together, for purposes of convenience in description.

A slideway is provided through housing 12 for receiving a magnetic recording medium. The slideway is conveniently shown in the form of brass or other non-magnetic sleeve 49 passing longitudinally through core 46. Sleeve 49 is arranged to turn outwardly and to define a circle around the magnet in the space between north poles 47 and south pole 48 and to project out of the opposite end of core 46.

An elongate magnetic medium in the form of recording wire 51 is arranged to be slidably passed through sleeve 49 from playout reel 17 to take-up reel 27 during operation of the tool.

The magnet of this invention may be a permanent magnet and set up a DC magnetic field, or alternatively, it may be provided with an electrical coil, such as coil 52, which coil could be connected with a power source, thus making an electromagnet producing AC magnetic flux.

It will be observed that each of the north poles 47 is provided with a pointed or sharpened tip 53 to facilitate the concentration of radial flux as will be explained hereinafter. In addition, north poles 47 must be so dimensional and arranged that radial spaces 54 are provided therebetween. Spaces 54 may be air spaces, or may be filled with a non-magnetic material such as brass or the like. In any event, the purpose of spaces 54 is to prevent diversion of magnetic flux from one north pole to another during operation of the tool.

Furthermore, the axial spaces 55 between each of the north poles 47 and south pole 48 are either air spaces or are filled with a non-magnetic material and are of such size to prevent shunting of flux between north poles 47 and south pole 48, except to the extent that will now be explained.

Each of the north poles 47 is provided with a small magnetic portion near the end thereof in the form of projections 61, which project toward south pole 48 and abut against sleeve 49.

Similarly, south pole 48 is provided with a plurality of magnetic projections 62 which extend toward north poles 47 and abut against sleeve 49 at a position just opposite from the projection 61 attached to the north poles.

Thus, there is formed a flux shunting path indicated by arrows 63 between each north pole 47 and south pole 48. The sizes of projections 61 and 62 are so selected and positioned apart that when tips 53 of north poles 47 pass over a defect in pipe 41, such as pit 43, the increased magnetic reluctance between north pole 47 nearest the pit and pipe 41 will cause magnetic flux to be shunted through projections 61 and 62, and at the same time, the shunted flux will pass through sleeve 49, which is positioned between projections 61 and 62. Thus, the shunted flux will be applied to recording wire 51 passing through sleeve 49. This generally describes one embodiment of the means for applying variations in reluctance in the concentrated radial flux path to the magnetic medium.

In operation then, housing 12 will be passed through a ferromagnetic tubular member such as pipe 41 as seen in FIG. 2. The magnet either as a permanent magnet or as an electromagnet, will establish a magnetic field with radial flux lines passing between north poles 47 and pipe 41 through narrow or concentrated radial flux paths indicated by arrows 64.

Magnetic flux will pass through pipe 41, which path is indicated by arrows 65 with the magnetic flux then passing between pipe 41 and south pole 48 through broad or dispersed flux paths indicated by arrows 66.

Thus, it may be seen that the primary reluctance in the magnetic field so established is in the concentrated radial flux paths indicated by arrows 64. Hence, when the magnet passes over a defect such as pit 43, there will be increased reluctance in the concentrated radial flux path of the particular north pole which passes over the pit. This increased reluctance will cause flux to be shunted through the shunted flux path associated with the north pole which passed over the defect, which shunted flux path is indicated by arrow 63.

Recording wire 51 will normally have established therein a magnetic field of predetermined intensity and frequency, thereby providing the wire with magnetic poles serially aligned therein. The shunted flux applied to wire 51 will demagnetize it in proportion to the size of the pit. Measuring the amount and extent of demagnetization that has occurred on wire 51 will give an indication of the amount and extent of pits that were detected in pipe 41.

Since in the embodiment just discussed, wire 51 will have continuously passed around the full internal circumference of pipe 41, one magnetic medium or wire will have recorded thereon an indication of all of the significant defects in pipe 41 passed over by poles 47. Thus, it will be seen that the inspection unit has no exposed movable parts which could be easily fouled by sand, scale or paraffin, since the inspection unit is sealed off as described above.

If all of the eight north poles 47 shown in FIGS. 2 and 3 were described as one row of north poles, it is then possible to understand that a plurality of rows of north poles could be added to core 46, with the rows spaced axially apart from each other. Thus, it would be possible to perform more definitive inspection, still using only one recording wire and passing it successively through the plurality of rows, or alternatively, a separate wire could be used for each row. In any event, if the record wire has previously been magnetized as discussed above, the erasure or demagnetization which occurs will be in direct proportion to the number and extent of pits in the pipe being inspected.

Another alternative with the embodiment shown in FIG. 2 is that instead of one wire 51 as shown, there could be eight wires, with only one wire passing through each shunted flux path. This would permit inspection closer to pipe collars, since with only one wire, the magnetic field in a pipe collar would erase all the wire in the magnet at the instant the collar was passed.

Referring now to FIG. 4, another embodiment of the inspection and recording unit of this invention is shown. Pipe 71 is shown having internal pits 72–76. Housing 12 of the tool of this invention is shown with a magnet positioned therein having core 78 and a plurality of north poles 79 extending radially therefrom and one annular south pole 80 in the shape of a cylinder surrounding core 78. It will be observed that core 78 is mounted upon support rod 81 for purposes of convenience, but rod 81 may optionally be omitted since the magnet is not designed to rotate, and may therefore be described as fixed.

North poles 79 are circumferentially arranged around core 78 to form one row, as best seen in FIG. 5. There is thus provided an air gap or spaces 87 so that there will be no shunting of flux from one north pole to another as one pole encounters greater reluctance resulting from a pit. Spaces 87 may, of course, be filled with a non-magnetic material for purposes of convenience.

Similarly, each of the north poles 79 is axially spaced apart from south pole 80 such that there is an annular space 88 between the row of north poles 79 and south pole 80. Space 88 may likewise be filled with a non-magnetic material for purposes of convenience.

While the annular outside surface of south pole 80 extends all the way out to housing 12 in FIG. 4, it will be observed that north poles 79 are each formed with a knife edge 89 being positioned a small distance from housing 12.

A plurality of slideways in the form of brass sleeves 90 are positioned to pass through core 78, then radially outward through space 88, then through the spaces between knife edges 89 and housing 12, and then radially inward. Thus, one brass sleeve 90 passes over the end of each of the north poles 79. Each of the sleeves 90 has an elongate medium in the form of a premagnetized recording wire 91 slidably passing therethrough, and winding on and off of playout reel 17 and take-up reel 27 just as with that embodiment shown in FIG. 2 when a plurality of recording wires are used. Also, this embodiment is incorporated in housing 12 and moved through the pipe just as that in FIG. 2. There is thus described another embodiment of the means for applying variations in reluctance in the concentrated radial flux path to the magnetic medium or recording wire.

The magnet in this embodiment may be an electromagnet, but is conveniently shown in the form of a permanent magnet. Thus, when housing 12 as shown in FIG. 4 is passed through pipe 71, a magnetic field will be established, with radial flux passing between north poles 79 and pipe 71 via a plurality of narrow or concentrated radial flux paths indicated by arrows 94, and in so doing, the radial flux will pass through sleeves 90 at the point adjacent to edges 89 of north poles 79.

Magnetic flux will pass longitudinally through pipe 71, which flux is indicated by arrows 95. Flux will also be passing between pipe 71 and south pole 80 via a dispersed or broad radial flux path indicated by arrows 96.

It is apparent that the primary reluctance in the magnetic field will be adjacent to edges 89 of north poles 79, since south pole 80 presents a substantially larger surface adjacent to pipe 71 so that flux has a greater area over which to pass from pipe 71 to magnet 77.

When there are no pits under edges 89 of north poles 79, recording wire 91 will be substantially demagnetized by the concentrated radial flux passing between edges 89 and pipe 71 and through sleeves 90. However, when edge 89 passes a pit, such as pit 73 or pit 74, there will be greater reluctance in the concentrated or narrow radial flux path, with the result that there will be less flux passing between pipe 71 and that north pole passing over the pit. Hence, the recording wire associated with that particular north pole will not be demagnetized to the extent that it would have been, if there were no pits. Thus, the signal remaining on that wire will represent or indicate the size and depth of the pit detected. With this embodiment, recording wires 91 will be demagnetized in inverse proportion to the reluctance in the concentrated flux paths between north poles 79 and pipe 71.

As with the previous embodiment, the apparatus shown in FIG. 4 can likewise be modified by the addition of one or more rows of north poles such that more definitive coverage is given to the inside surface of pipe 71, with the result that smaller pits may be detected. Also, only one recording wire could be used in one slideway which could be arranged to pass 360° around the magnet, passing through a part or all of the narrow or concentrated radial flux paths, with all the pits being recorded on one wire.

FIG. 6 shows another embodiment of this invention, which is similar to that shown in FIGS. 4 and 5, but with a different arrangement of the north pole with respect to the recording wire. Here, a magnet is shown having magnetic core 102 fixedly mounted on shaft 103 and positioned inside of search unit housing 12, which is positioned inside pipe 104. Core 102 has south pole 105 in the form of a cylinder attached thereto and is similar to the south poles shown in FIGS. 2 to 4, and hence presents a broad external circumferential surface for the flow of magnetic flux.

However, the north pole end of magnet core 102 is formed with a radially extending annular flange 110 which has a double beveled outer edge forming an annular knife-like edge 111.

Spaced radially outward from edge 111 is a plurality of flux concentrators 112 having generally cubical shapes with a double beveled edge 113 adjacent to and spaced radially outward from edge 111, such that a plurality of fixed flux paths are created between flange 110 and each concentrator 112.

A slideway in the form of brass sleeve 114 passes through core 102 and thence outward through the fixed flux path described above. Sleeve 114 is adapted to slidably receive recording wire 115 therethrough. In this embodiment, the flux passing through the fixed recording flux path is applied to a magnetic medium or recording wire 115 at right angles. The foregoing describes another embodiment of the means for applying variations in reluctance in the concentrated radial flux path to a recording wire.

FIG. 8 is a fragmentary view similar to the view of FIG. 6, but showing a variation thereof. In this instance, flange 118 is similar to flange 110 of FIG. 6. Also, flux concentrator 119 is similar to concentrator 112 of FIG. 6. Flange 118 has a double beveled radially extending portion terminating in annular edge 120. Concentrator 119 has knife-like edge 121 similar to edge 113 in FIG. 6. Edges 120 and 121 are concentrically and radially spaced apart a sufficient distance to permit a slideway in the form of brass sleeve 122 to pass therebetween, through which recording wire 123 is passed. However, it will be noted that edges 120 and 121 are also axially spaced apart from one another a short distance, such as ¼ to ½ inch. Thus, when magnetic flux passes between edge 120 to edge 121, that flux will pass through sleeve 122 at an angle of less than 90°. When wire 123 has previously been provided with a magnetic signal of a predetermined frequency and intensity, it may be demagnetized by another magnetic field of a given frequency and intensity. However, by applying the demagnetizing magnetic flux to the recording wire in a longitudinal manner, i.e., at an angle of less than 90°, greater demagnetization can be performed with a given magnetic field. Hence, the embodiment shown in FIG. 8 will permit a more definitive detection of variations in reluctance in the concentrated radial flux path between concentrator 119 and the pipe being inspected, and thus provide a better signal-to-noise ratio. It is to be understood that a plurality of concentrators 119 can be circumferentially arranged around flange 118 to give several fixed recording paths and that there may also be a plurality of concentric rows of concentrators used, as with the embodiment shown in FIG. 6.

Further modifications may be made in the invention as particularly described without departing from the scope of the invention. Accordingly, the foregoing description is to be construed illustratively only and is not to be construed as a limitation upon the invention as defined in the following claims.

I claim:
1. In a method of testing a ferromagnetic tubular member for defects comprising the steps of:
   establishing a magnetic field in a portion of said tubular member and in a fixed magnet disposed closely adjacent thereto, said field having
      a first group of radial flux lines passing between said tubular member and one pole of said magnet and forming a first radial flux path, and
      a second group of flux lines passing between the other pole of said magnet and said tubular member and forming a second radial flux path,
   causing relative movement between said tubular member and said magnet in a direction generally transverse to said radial flux paths,
   recording on an elongate magnetic medium variations in the reluctance of said first radial flux path during said relative movement as indications of defects in said tubular member said elongate magnetic medium passing through a portion of said magnet during said recording.
2. In a method of testing a ferromagnetic tubular member for defects comprising the steps of:
   establishing a magnetic field in said tubular member by use of a fixed magnet disposed closely adjacent thereto, said field having
      concentrated radial flux lines between said tubular member and said magnet and forming a narrow radial flux path, and
      dispersed radial flux lines between said tubular member and said magnet forming a broad radial flux path,
   causing relative movement between said tubular member and said magnet in a direction generally transverse to said radial flux lines,
   recording on an elongate magnetic medium variations in the reluctance of said narrow radial flux path during said relative movement as indications of defects in said tubular member said elongate magnetic medium passing through said narrow radial flux path during said recording.
3. The method as claimed in claim 1 comprising the additional steps of:
   detecting said variations in said reluctance of said first radial flux path by shunting flux from said first radial flux path as said reluctance increases, and
   applying said shunted flux to said magnetic medium as indications of defects in said tubular member.
4. The method as claimed in claim 3 comprising the additional steps of:
   initially providing said elongate magnetic medium with a magnetic signal of predetermined intensity,
   applying said shunted flux to said magnetic medium by passing said medium through the path of said shunted flux,
   and demagnetizing said elongate medium in proportion to variations in the reluctance of said first radial flux path during said passing.
5. The method as claimed in claim 3 comprising the additional steps of:
   producing a plurality of said first radial flux paths circumferentially around the internal surface of said tubular member,
   shunting flux from each of said first radial flux paths as reluctance increases, whereby a plurality of shunted flux paths are formed,
   initially providing said elongate magnetic medium with a magnetic signal of predetermined intensity, and
   applying said shunted flux to said magnetic medium by passing said medium through said shunted flux paths, and
   demagnetizing said medium in proportion to variations in reluctance in said first radial flux paths.
6. The method as claimed in claim 1 comprising the additional step of:
   recording said variations in said reluctance of said radial flux path by passing said elongate magnetic medium through said first radial flux path.
7. The method as claimed in claim 6 comprising the additional steps of:
   initially providing said elongate magnetic medium with a magnetic signal of predetermined intensity, and
   applying said first group of radial flux to said medium to thereby demagnetize said medium in inverse proportion to the reluctance of said first radial flux path.
8. The method as claimed in claim 1 comprising the additional steps of:
   establishing in said magnetic field a supplementary fixed recording flux path spaced radially inwardly from said first radial flux path, and
   recording said variations in said reluctance of said first radial flux path by passing said elongate magnetic medium through said fixed recording flux path.
9. The method as claimed in claim 8 comprising the additional steps of:
   initially providing said elongate magnetic medium with a magnetic signal of predetermined intensity, and
   applying flux in said fixed recording flux path to said magnetic member to thereby demagnetize said medium in inverse proportion to the reluctance of said first radial flux path.
10. The method as claimed in claim 9 wherein the flux in said fixed recording flux path is applied to said magnetic medium at an angle of less than 90° with respect to the longitudinal axis of said medium at the point where demagnetization occurs.
11. An apparatus for detecting defects in a tubular ferromagnetic member comprising:
   a housing adapted to be moved longitudinally through said tubular member,
   a recording means contained within said housing and comprising
      a fixed magnet adapted for disposition adjacent the internal surface of said tubular member and having
         a magnetic core,
         a first magnetic pole attached to said core for passing radial flux between said first pole and said tubular member through a concentrated radial flux path,
a second magnetic pole attached to said core for passing radial flux between said second pole and said tubular member through a dispersed radial flux path,
a slideway of substantially constant dimension through said housing and through at least a part of the flux path including said concentrated radial flux path and slidably receiving an elongate magnetic medium, such that variations in reluctance in said concentrated radial flux path varies the flux applied to said magnetic medium,
means attached to said housing for causing relative movement of said housing through said tubular member, and
means connected to said housing for moving said magnetic medium through said slideway when said housing is moved through said tubular member,
whereby said variations are recorded on said magnetic medium during said movements as indications of defects in said tubular member.

12. The apparatus as claimed in claim 11 wherein:
said second magnetic pole has a substantially larger surface area for transmitting flux between said core and said tubular member than does said first magnetic pole.

13. The apparatus as claimed in claim 11, said recording means having:
means positioned between said first and second magnetic poles for shunting flux from said concentrated radial flux path as the reluctance in said concentrated radial flux path increases, and
said slideway passing through the path of said shunted flux rather than through said concentrated radial flux path.

14. The apparatus as claimed in claim 13, wherein:
said elongate magnetic medium is initially provided with a magnetic signal of predetermined intensity, and
said flux shunting means comprising
magnetic projections extending toward each other from said first and second poles and separated by a non-magnetic tube, said projections shunting flux through said tube as reluctance in said concentrated radial flux path increases, and
said tube forming a portion of said slideway through which said magnetic medium passes,
whereby said shunted flux demagnetizes said record medium in proportion to variations in said reluctance in said concentrated radial flux path.

15. The apparatus as claimed in claim 11 comprising:
a plurality of said first magnetic poles spaced circumferentially around said core for providing a plurality of concentrated radial flux paths,
each of said first poles provided with a magnetic flux shunting means positioned between each of said first poles and said second pole for shunting flux therebetween as the reluctance in each of said concentrated radial flux paths increases,
said magnetic medium being initially provided with a magnetic signal of predetermined intensity, and
said slideway passing successively through at least two of said shunting means rather than through said concentrated radial flux paths,
whereby said shunted flux demagnetizes said record medium in proportion to variations in said reluctance in said concentrated radial flux paths.

16. An apparatus as claimed in claim 11 wherein:
said slideway is a non-magnetic tube, a portion of which passes through said concentrated radial flux path.

17. An apparatus as claimed in claim 16 wherein:
said magnetic medium is initially provided with a magnetic signal of predetermined intensity,
whereby said magnetic medium is demagnetized in inverse proportion to the reluctance in said concentrated radial flux path.

18. The apparatus as claimed in claim 11 with said recording means comprising:
a flux concentrator spaced between said first magnetic pole and said tubular member and forming a fixed flux path between said concentrator and said first magnetic pole, and
said slideway defines a path through said fixed flux path.

19. The apparatus as claimed in claim 11, comprising:
a plurality of said first magnetic poles spaced circumferentially around said core, each of said first magnetic poles having a plurality of fixed flux paths,
a plurality of said slideways, each of which passes through one of said fixed flux paths, and
a plurality of said magnetic mediums, each of which is initially magnetized and each of which passes through one of said slideways,
whereby said magnetic mediums are individually demagnetized in inverse proportion to the reluctance in said concentrated radial flux path associated with the fixed flux path through which each of said magnetic mediums pass.

20. The apparatus as claimed in claim 18 wherein:
the edges of said first magnetic pole and said flux concentrator forming the fixed flux path are provided with sharp edges, which edges are radially aligned with each other.

21. The apparatus as claimed in claim 18 wherein:
the adjacent edges of said first magnetic pole and said flux concentrator are concentrically aligned and axially spaced apart, thereby forming a fixed flux path having an angle of less than 90° with respect to the longitudinal axis of said slideway at the point where said slideway passes through said fixed flux path.

References Cited

UNITED STATES PATENTS

| | | | |
|---|---|---|---|
| 2,067,804 | 1/1937 | Thorne | 324—37 |
| 2,554,844 | 5/1951 | Swift | 324—34 |
| 2,907,111 | 10/1959 | Calkins | 324—34 |
| 2,992,390 | 7/1961 | De Witte | 324—34 |
| 3,015,063 | 12/1961 | Ownby | 324—34 |
| 3,284,701 | 11/1966 | Kerbow | 324—37 |

RUDOLPH V. ROLINEC, *Primary Examiner.*

WALTER L. CARLSON, RICHARD B. WILKINSON, *Examiners.*

R. J. CORCORAN, *Assistant Examiner.*